Oct. 15, 1957  W. G. HARVEY  2,809,394
AUTOMATIC DISCHARGE FOR MOLDING MACHINE
Filed Dec. 1, 1953  2 Sheets-Sheet 2
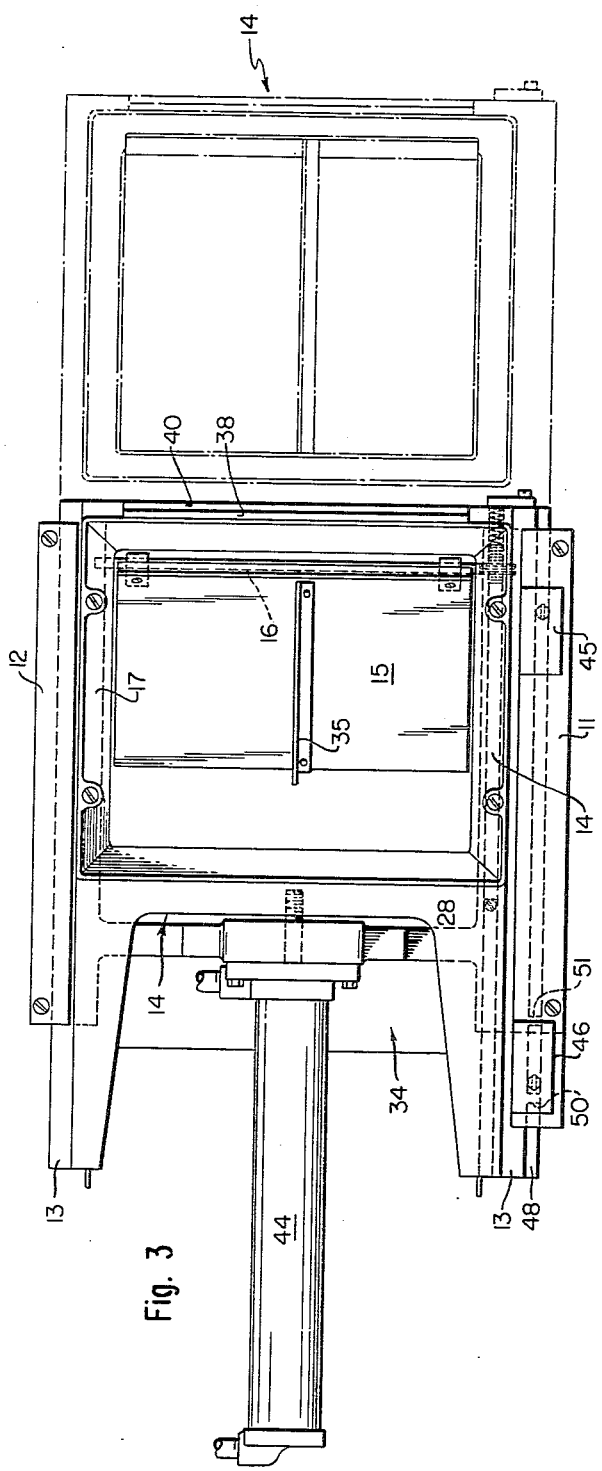
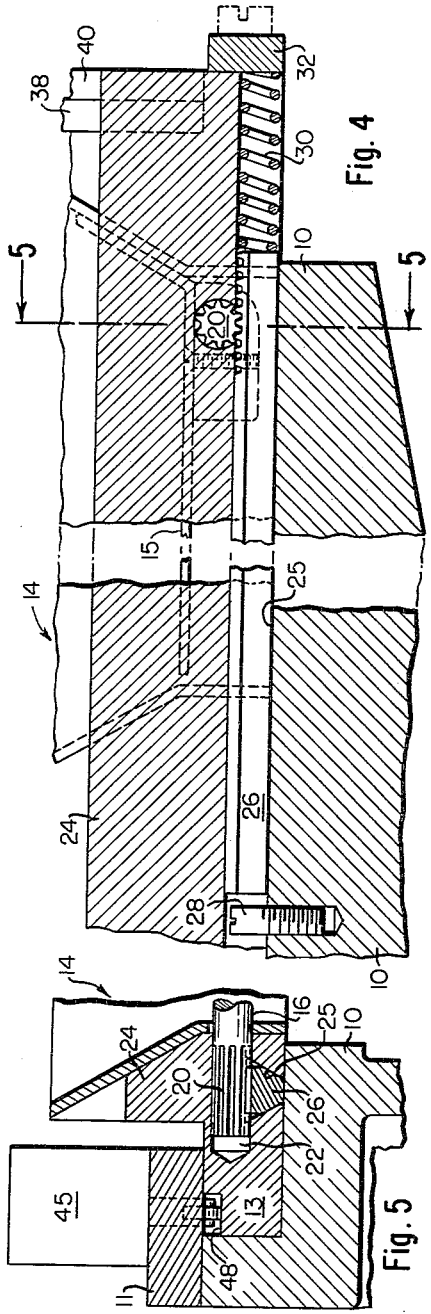
INVENTOR.
WILFRED G. HARVEY
BY
ATTORNEYS

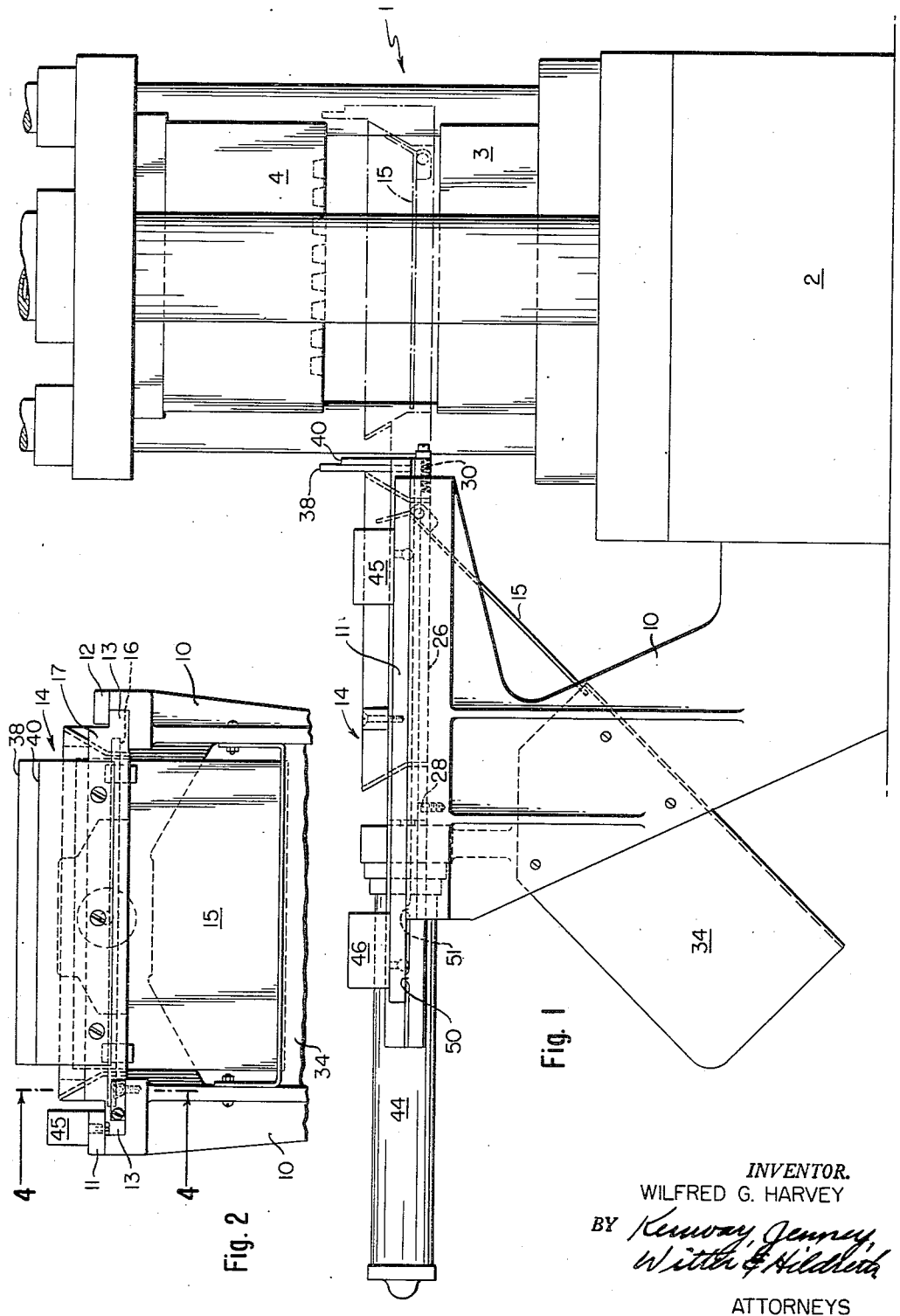

United States Patent Office 2,809,394
Patented Oct. 15, 1957

2,809,394

AUTOMATIC DISCHARGE FOR MOLDING MACHINE

Wilfred G. Harvey, Leominster, Mass.

Application December 1, 1953, Serial No. 395,472

2 Claims. (Cl. 18—16)

In the manufacture of molded parts from conventional thermoplastic materials it is of course necessary to strip the molds after each operation and to this end ejector or knock-out pins are provided. However, there is a tendency for the molded articles to cling to the pins and hence in autmoatic molding operations it is necessary to provide stripping means which not only positively strip the articles from the mold, but also discharge them into a chute or other conveyance. Although various means have been suggested for accomplishing this end, the mechanisms employed are rather complicated and expensive. Furthermore, where the molds are designed to produce different articles, such stripping means discharge them into a common receptacle from which they are later removed and sorted.

The principal object of the present invention is to provide a simple, efficient and reliable mechanism not only capable of automatically discharging the articles from a mold, but also of sorting the articles when the mold is designed to provide different size or shaped articles.

Further objects relate to various features of construction and will be apparent from a consideration of the following description and the accompanying drawings wherein:

Fig. 1 is a side elevation of a mold having an automatic discharge mechanism constructed in accordance with the present invention;

Fig. 2 is a front elevation of the discharge mechanism;

Fig. 3 is a top plan view of the discharge mechanism;

Fig. 4 is an enlarged section on the line 4—4 of Fig. 2; and

Fig. 5 is a section on the line 5—5 of Fig. 4.

The improved discharge mechanism herein shown is designed for use in connection with a molding press or the type having a fixed lower die plate and an upwardly or vertically movable upper die plate provided with ejector or knock-out pins having actuating means for operating them when the mold is open. Such a press may be manually operated, or semi- or fully automatic in operation as disclosed more fully in such standard texts as the Handbook of Plastics by Simonds and Ellis (D. Van Nostrand) to which reference may be had for a more detailed description.

In accordance with the present invention my improved discharge mechanism comprises a stationary frame member preferably mounted on the base of the machine and provided with means for supporting a tray-like member, such as a slide, for movement from a retracted position outside the die plates to an advanced position beneath the upper die plate so as to receive articles ejected therefrom when the mold is open.

In order to insure a positive stripping of the mold the leading edge of the slide is provided with a wiper so designed that it is highly flexible in a direction opposite that of inward movement of the slide, thereby permitting it to pass lightly over the molded article when moving to advanced position, but relatively inflexible in a direction opposite that of outward movement of the slide so as forcibly to strip articles clinging to the ejector pins. The bottom wall of the slide is preferably pivotally mounted so as to swing from a horizontal or closed position to an inclined or discharging position, and associated with the pivotal bottom wall or tray are means operative to maintain it in closed position when traveling to and from advanced position and to swing it to open position when in or approaching retracted position, thereby causing the discharge of articles carried thereby into a chute or other conveyance.

Where the die plates are designed to mold different articles during the same operation, an automatic sorting may be achieved by partitioning or dividing the bottom wall so as to provide a plurality of tray-like receptacles having either a common pivotal mounting or individual pivotal mountings which may operate as above described in connection with a plurality of chutes appropriately designed to segregate the different articles.

Where fully automatic operation is desired, the slide is operated in time realtion to the operation of the ejector pins and die plates so that when the press opens the slide moves inwardly beneath the upper die plate to receive articles ejected therefrom by the pin, after which the slide returns and not only delivers the articles to a chute, conveyance or other receptacle, but also initiates the next operating cycle of the press.

Referring to the accompanying drawing which show one embodiment of the invention, the numeral 1 designates an automatic injection machine or press having a base 2, a fixed lower die plate 3 and a vertically movable upper die plate 4 equipped with ejector or knock-out pins, actuating means for operating the die plates and ejector pins which may be of known design, and a loading or feeding mechanism which may be of the design shown in my copending application Serial No. 390,883, filed November 9, 1953.

Attached to the front of the base 2 is frame 10 having interconnected spaced C-shaped legs the upper edges of which are juxtaposed to the die plates, as shown in Fig. 1, and the upper face of the frame is provided with spaced horizontal guideways 11 and 12 which receive the longitudinally extending flanges 13 of a tray-like slide 14 so as to support it for sliding movement from a retracted position outside the die plates, as shown by the full lines of Figs. 1 to 3, to an advanced position, as shown by the broken lines of Figs. 1 and 3, wherein the slide is beneath the upper die plate 4.

The bottom wall or pan 15 of the slide 14 is secured by spaced lugs to a pintle 16, one end of which is journaled in an opening in the side wall 17 of the slide and the other end of which is formed with a pinion 20 which extends into an opening 22 (Fig. 5) in the opposite side wall 24 of the slide. The side wall 24 is formed with a longitudinally extending channel 25 (Figs. 4 and 5) communicating with the opening 22 and slidably mounted in this channel is a rack 26 the teeth of which engage the pinion 20 as shown more clearly in Figs. 4 and 5. The outer end of the rack is engageable with a stop 28 (Fig. 4) fixed to the frame 10 so as to extend into the channel 25, and the opposite end of the rack engages one end of a compression spring 30 disposed in the inner end of the channel with its opposite end acting against a retainer block 32 screwed to the leading edge of the slide 14.

The construction and arrangement of parts are such that when the slide moves toward advanced position the rack is disengaged from the stop 28 and the spring 30 urges it inwardly to the left (Figs. 1 and 5) so to rotate pinion 20 clockwise, thereby swinging the pan 15 to horizontal or closed position; and when the slide is moved to retracted position, the end of the rack engages the stop 28 which causes it to move outwardly or to the right so as to rotate the pinion counterclockwise, thereby swinging the pan 15 downwardly to open or inclined position so as to discharge articles carried thereby into a chute 34 disposed between the legs of the frame 10.

When the die plates are designed to mold different articles, the pan 15 may be divided by one or more partitions 35 (Fig. 3) defining a plurality of tray-like receptacles or sections corresponding to the sections of the die plates in which case the chute 34 is divided into ducts or passages to receive the articles carried by the respective sections so as to segregate them, thus providing for automatic sorting.

The front side or leading edge of the slide carries a wiper consisting of a strip of rubber 38 or the like relatively flexible material which extends upwardly a distance sufficient to contact the lower face of the upper die plate, and a rigid backing or reinforcing plate 40, the upper edge of which is spaced below that of the flexible strip 38, as shown in Figs. 1 and 2. With this construction and arrangement of parts the wiper is highly flexible in a direction opposite that of inward or advancing movement of the slide so as to pass harmlessly by the molded articles carried by the upper die plate 4—but relatively inflexible in the opposite direction so as forcibly to strip articles clinging to the ejector pins or the die plates.

The movement of the slide 14 to and from advanced position is effected by a pressure cylinder 44 having a piston suitably connected with the rear of the slide. The flow of fluid to the cylinder is controlled by a valve mechanism which in turn is actuated by an electric control system which includes a limit switch 45 secured to the front edge of the guideway 11 and a second limit switch 46 of the snap type which is secured to the rear of the guideway, both switches having the usual actuating fingers which extend downwardly into the recessed upper edge 48 (Fig. 5) of the flange 13 so as to be engageable with upwardly extending lugs 50 and 51 (Figs. 1 and 3) formed on the flange 13. The construction arrangement of parts are such that as the slide 14 moves inwardly toward advanced position, the lug 50 passes switch 46 and as the slide approaches its fully advanced position the lug 51 closes the switch 45, and in traveling back to retracted position the lug 51 opens switch 45 and as the slide approaches its fully retracted position the lug 50 operates switch 46.

The switch 45 is connected in an electric control system for the ejector pins, and the switch 46 is connected in an associated electric control system including timers and relays governing the operation of the press or clamp mechanism, the feeding mechanism and valve control for the pressure cylinder 44. Since such control systems are now well known in the art a more detailed description is unnecessary.

A summary of the operation of the machine is as follows:

Assuming that an operating cycle has just been completed and the parts are in the position shown by the solid lines of the drawings—the movement of the slide 14 to retracted position has operated the switch 46 which sends the impulse which resets and starts the timers which in turn govern the sequence of operations constituting a complete operating cycle. Following the operation of the switch 46, pressure is admitted to the cylinder 44 to move the slide inwardly to advanced position, as shown by the broken lines. As the slide commences its inward movement the rack 26 disengages the stop 28 whereupon the spring 30 acts to close the pan 15 and hold it in closed position. During its inward travel the wiper 38 brushes by the articles held by the die plate 4 and as the slide approaches its advanced position the lug 51 operates switch 45 which closes the circuit to the operating mechanism for the ejector pins, whereupon the articles are ejected, some or all of which may drop onto the pan 15.

The operation of the ejector pins is followed by the operation of the valve control for cylinder 44 which causes pressure to be admitted to the opposite end of the cylinder, thereby retracting the slide 14. As the slide starts its outward movement to retracted position, the switch 45 first opens so as to reset the ejector pins and as the slide moves back to retracted position the wiper 38 forcibly removes any articles clinging to the pins or die plate, brushing them into the pan 15. As the slide approaches retracted position the rack 26 engages stop 28 which swings the pan to open position, causing its contents to be dumped into the chute 34 and the switch 46 is operated to reset the timers, etc. which in turn successively operate the feeding and clamping mechanism, thus completing the cycle.

It will be observed that the operation of the discharge mechanism may be manual or fully automatic, but in either case the articles are positively stripped from the mold or die plates without injury and where the die plates are designed to produce different articles, the discharge mechanism automatically sorts them in a simple and efficient manner.

While I have shown and described one embodiment of the invention it is to be understood that this disclosure is for the purpose of illustration and various changes and modifications may be made without departing from the spirit and scope of the invention as set forth in the appended claims.

I claim:

1. In a molding press having a fixed lower die plate and a vertically movable upper die plate provided with ejector pins having actuating means for operating them— a discharge mechanism comprising a supporting frame juxtaposed to the die plates, a tray-like member mounted on said frame and movable from a retracted position outside said die plates inwardly to an advanced position beneath the upper die plate so as to receive articles ejected therefrom when the mold is open, and a wiper carried by the leading edge of said member, said wiper being of flexible material and projecting upwardly, a reenforcing plate contiguous to the outer face of said wiper and below its upper edge, said plate rendering said wiper highly flexible in a direction opposite that of inward movement of said slide and relatively inflexible in a direction opposite that of outward movement of said slide so as forcibly to strip articles clinging to the ejector pins.

2. In a molding press having a fixed lower die plate and a vertically movable upper die plate provided with ejector pins having actuating means for operating them— a discharge mechanism comprising a supporting frame juxtaposed to the die plates, a tray-like slide mounted on said frame and movable from a retracted position outside said die plates inwardly to an advanced position beneath the upper die plate so as to receive articles ejected therefrom when the mold is open, said slide having a bottom wall pivotally mounted so as to swing downwardly, means operative to hold said bottom wall in closed position as said slide moves to and from advanced position, means operative when said slide is in retracted position to swing said bottom wall downwardly so as to discharge articles carried thereby, and a wiper carried by the leading edge of said slide, said wiper projecting upwardly and being highly flexible in a direction opposite that of inward movement of said slide and relatively inflexible in a direction opposite that of outward movement of said slide so as forcibly to strip articles clinging to the ejector pins.

References Cited in the file of this patent

UNITED STATES PATENTS

| | | |
|---|---|---|
| 2,122,648 | Johnson | July 5, 1938 |
| 2,321,252 | Sayre | June 8, 1943 |
| 2,347,972 | Scott et al. | May 2, 1944 |
| 2,582,891 | Strauss | Jan. 15, 1952 |
| 2,666,228 | Strong et al. | Jan. 19, 1954 |